(12) United States Patent
Tahir et al.

(10) Patent No.: US 11,423,244 B2
(45) Date of Patent: Aug. 23, 2022

(54) CLICK FIT MOUNT ADAPTER

(71) Applicant: FARO Technologies, Inc., Lake Mary, FL (US)

(72) Inventors: Muhammad Umair Tahir, Stuttgart (DE); Oliver Zweigle, Stuttgart (DE); João Santos, Kornwestheim (DE)

(73) Assignee: FARO TECHNOLOGIES, INC., Lake Mary, FL (US)

(*) Notice: Subject to any disclaimer, the term of this patent is extended or adjusted under 35 U.S.C. 154(b) by 0 days.

(21) Appl. No.: 17/142,859

(22) Filed: Jan. 6, 2021

(65) Prior Publication Data

US 2021/0216730 A1 Jul. 15, 2021

Related U.S. Application Data

(60) Provisional application No. 62/958,989, filed on Jan. 9, 2020.

(51) Int. Cl.
*G06K 7/10* (2006.01)

(52) U.S. Cl.
CPC ....... *G06K 7/1098* (2013.01); *G06K 7/10881* (2013.01)

(58) Field of Classification Search
CPC ............ G06K 7/10881; G06K 7/1098; G06K 7/1093; G06K 7/1097; G06K 2007/10485; G06K 2007/10524
USPC .......... 235/472.01, 462.45, 472.02
See application file for complete search history.

(56) References Cited

U.S. PATENT DOCUMENTS

| | | | |
|---|---|---|---|
| 9,372,265 B2 | 6/2016 | Zweigle et al. | |
| 9,513,107 B2 | 12/2016 | Zweigle et al. | |
| 9,739,886 B2 | 8/2017 | Zweigle et al. | |
| 10,067,231 B2 | 9/2018 | Zweigle et al. | |
| 10,203,413 B2 | 2/2019 | Zweigle et al. | |
| 10,282,854 B2 | 5/2019 | Zweigle et al. | |
| 10,445,913 B2 | 10/2019 | Santos | |
| 10,447,991 B1 | 10/2019 | Zweigle | |
| 10,546,419 B2 | 1/2020 | Zweigle | |
| 10,546,427 B2 | 1/2020 | Frank | |
| 10,565,718 B2 | 2/2020 | Zweigle et al. | |
| 11,058,019 B1* | 7/2021 | Yang ................. | H05K 5/023 |
| 2009/0001174 A1* | 1/2009 | Barkan ............. | G06K 7/10732 235/462.42 |

OTHER PUBLICATIONS

SPIEDigitalLibrary.org/conference-proceedings-of-spie, "The RS-700 Series of Infrared Line Scanners", 1983, all pages.*

* cited by examiner

*Primary Examiner* — Thien T Mai
(74) *Attorney, Agent, or Firm* — Cantor Colburn LLP

(57) ABSTRACT

A system including a multi-dimensional scanner includes a body including a chassis extending from the body, a connector assembly coupled to the chassis, and a plurality of interchangeable attachments. Each of the plurality of interchangeable attachments is securable to the body via the connector assembly and each of the plurality of interchangeable attachments is associated with a type of operation of the system.

17 Claims, 17 Drawing Sheets

CLICK FIT MOUNT ADAPTER

CROSS-REFERENCE TO RELATED APPLICATIONS

This application claims the benefit of U.S. Provisional Application 62/958,989 filed Jan. 9, 2020, the disclosure of which is incorporated herein by reference in its entirety.

BACKGROUND

The present application is directed to a system having a plurality of interchangeable attachments, and more specifically, to a connector assembly that allows each attachment suitable for use with the system to be easily connected and released from the system.

Existing systems having a multi-dimensional scanner commonly include a support fixed to or integrally formed with the body of the system. In instances where the scanner is intended to be grasped by a user and moved between a plurality of points to scan an area, the support is generally a handle. Alternatively, the support may be a mount for positioning the system on a surface or other support device. However, because each of these supports is formed as part of the body of the system, it is difficult to adapt operation a system intended for one mode of use, such as manual operation, to another mode, such as automatic operation via a mounted surface.

Accordingly, while existing scanners are suitable for their intended purposes, what is needed is a system that can be adapted for use in several different types of applications by allowing the support to be interchangeable.

BRIEF DESCRIPTION

According to one aspect of the invention, a system including a multi-dimensional scanner includes a body including a chassis extending from the body, a connector assembly coupled to the chassis, and a plurality of interchangeable attachments. Each of the plurality of interchangeable attachments is securable to the body via the connector assembly and each of the plurality of interchangeable attachments is associated with a type of operation of the system.

In addition to one or more of the features described above, or as an alternative, in further embodiments the connector assembly is receivable within an interior of at least one of the plurality of interchangeable attachments.

In addition to one or more of the features described above, or as an alternative, in further embodiments at least one of the plurality of interchangeable attachments includes a handle.

In addition to one or more of the features described above, or as an alternative, in further embodiments at least one of the plurality of interchangeable attachments includes a mounting stand having a planar mounting surface.

In addition to one or more of the features described above, or as an alternative, in further embodiments each of the plurality of interchangeable attachments is securable to the connector assembly via a lock pin.

In addition to one or more of the features described above, or as an alternative, in further embodiments the connector assembly further comprises a bore and at least one channel extending from the bore, and the lock pin further comprises a shaft including at least one detent movable between an extended position and a retracted position, wherein when one of the plurality of interchangeable attachments is secured to the connector assembly, the shaft is arranged within the bore and the at least one detent is arranged within the at least one channel.

In addition to one or more of the features described above, or as an alternative, in further embodiments the lock pin further comprises: a biasing mechanism for biasing the at least one detent into the extended position, and an actuator operably coupled to the at least one detent, the actuator being operable to oppose a biasing force of the biasing mechanism and transform the at least one detent into the retracted position arranged within the shaft.

In addition to one or more of the features described above, or as an alternative, in further embodiments the connector assembly further comprises: a chassis adapter; and a lock pin adapter affixed to the chassis adapter, wherein the lock pin adapter includes the bore and the at least one channel.

In addition to one or more of the features described above, or as an alternative, in further embodiments the chassis adapter is connectable to the chassis via a set screw.

In addition to one or more of the features described above, or as an alternative, in further embodiments the lock pin adapter further comprises a first section and a second section, and the chassis adapter further comprises a shallow groove, the first section of the lock pin adapter being positioned within the shallow groove.

In addition to one or more of the features described above, or as an alternative, in further embodiments an exterior surface of the chassis adapter is flush with an exterior of the second section of the lock pin adapter.

In addition to one or more of the features described above, or as an alternative, in further embodiments the plurality of interchangeable attachments includes a first attachment and a second attachment, the first attachment including a first lock pin, and the second attachment including a second lock pin.

In addition to one or more of the features described above, or as an alternative, in further embodiments the first lock pin is affixed to the first attachment.

A method of connecting a plurality of interchangeable attachments to a body of a system including a multi-dimensional scanner includes connecting a first attachment of the plurality of interchangeable attachments to the body of the system for a first type of operation of the system, disconnecting the first attachment from the body, and connecting a second attachment of the plurality of interchangeable attachments to the body for a second type of operation of the system, wherein during the first type of operation, the system is hand-held, and during the second type of operation, the system is positioned on a mounting surface.

In addition to one or more of the features described above, or as an alternative, in further embodiments connecting at least one of the first attachment and the second attachment to the body of the system further comprises: operating an actuator of a lock pin associated with at least one of the first attachment and the second attachment of the plurality of interchangeable attachments to retract one or more detents of the lock pin, installing at least a portion of the lock pin including the one or more detents into a connector assembly affixed to the body, releasing the actuator when the one or more detents of the lock pin are aligned with one or more channels formed in the connector assembly, and biasing the one or more detents of the lock pin outwardly and into engagement with the one or more channels of the connector assembly to couple the first attachment to the connector assembly.

In addition to one or more of the features described above, or as an alternative, in further embodiments a single lock pin is used for connecting the first attachment to the body and for connecting the second attachment to the body.

In addition to one or more of the features described above, or as an alternative, in further embodiments a first lock pin is used for connecting the first attachment to the body and a second lock pin is used for connecting the second attachment to the body.

In addition to one or more of the features described above, or as an alternative, in further embodiments disconnecting the first attachment from the body further comprises: operating the actuator of the lock pin associated to retract the one or more detents of the lock pin, removing the lock pin from the connector assembly, and releasing the actuator when the first attachment is separated from the connector assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
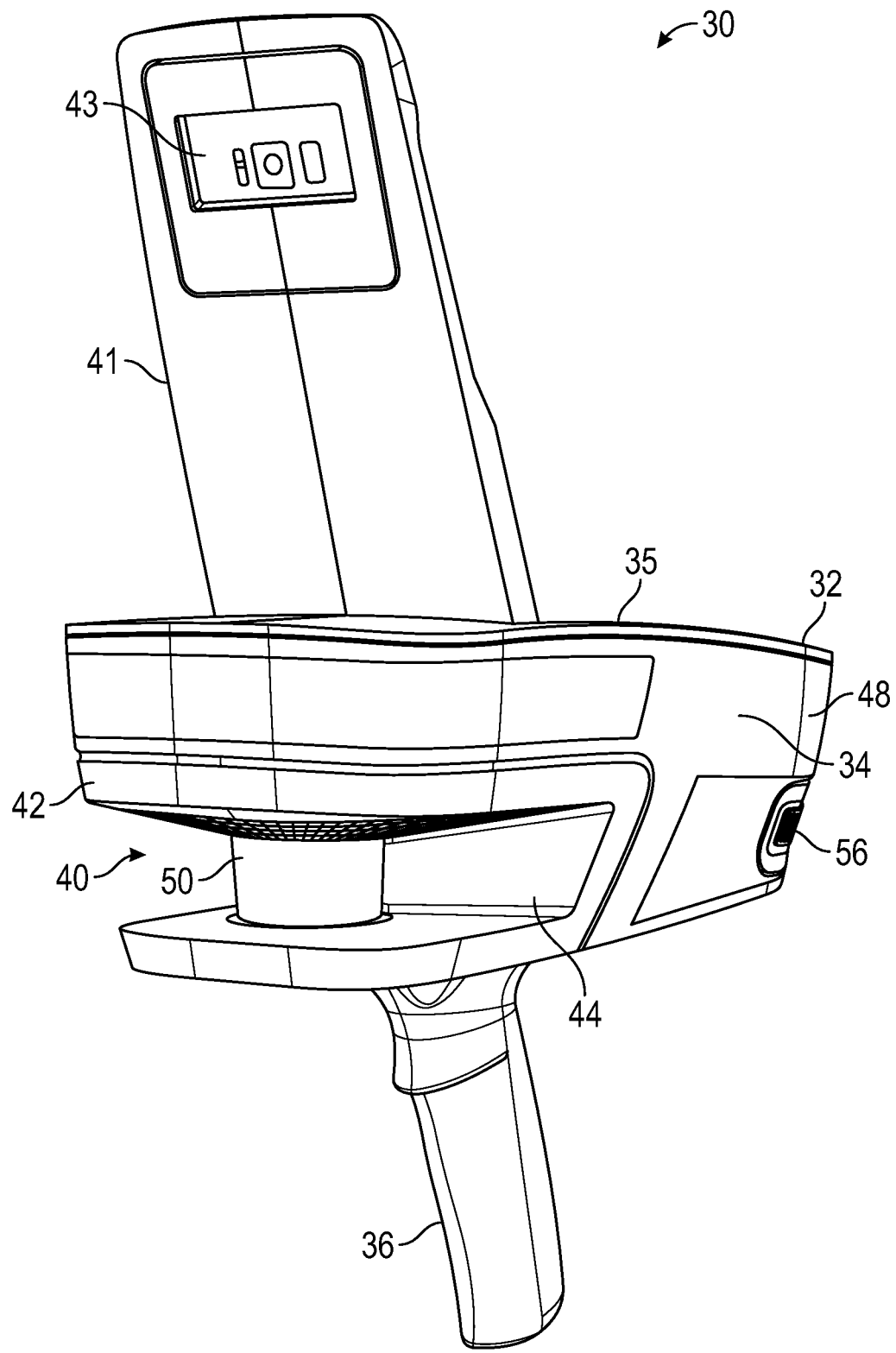
FIGS. 1-3 are perspective views of a scanning and mapping system in accordance with an embodiment.
Figure 2:
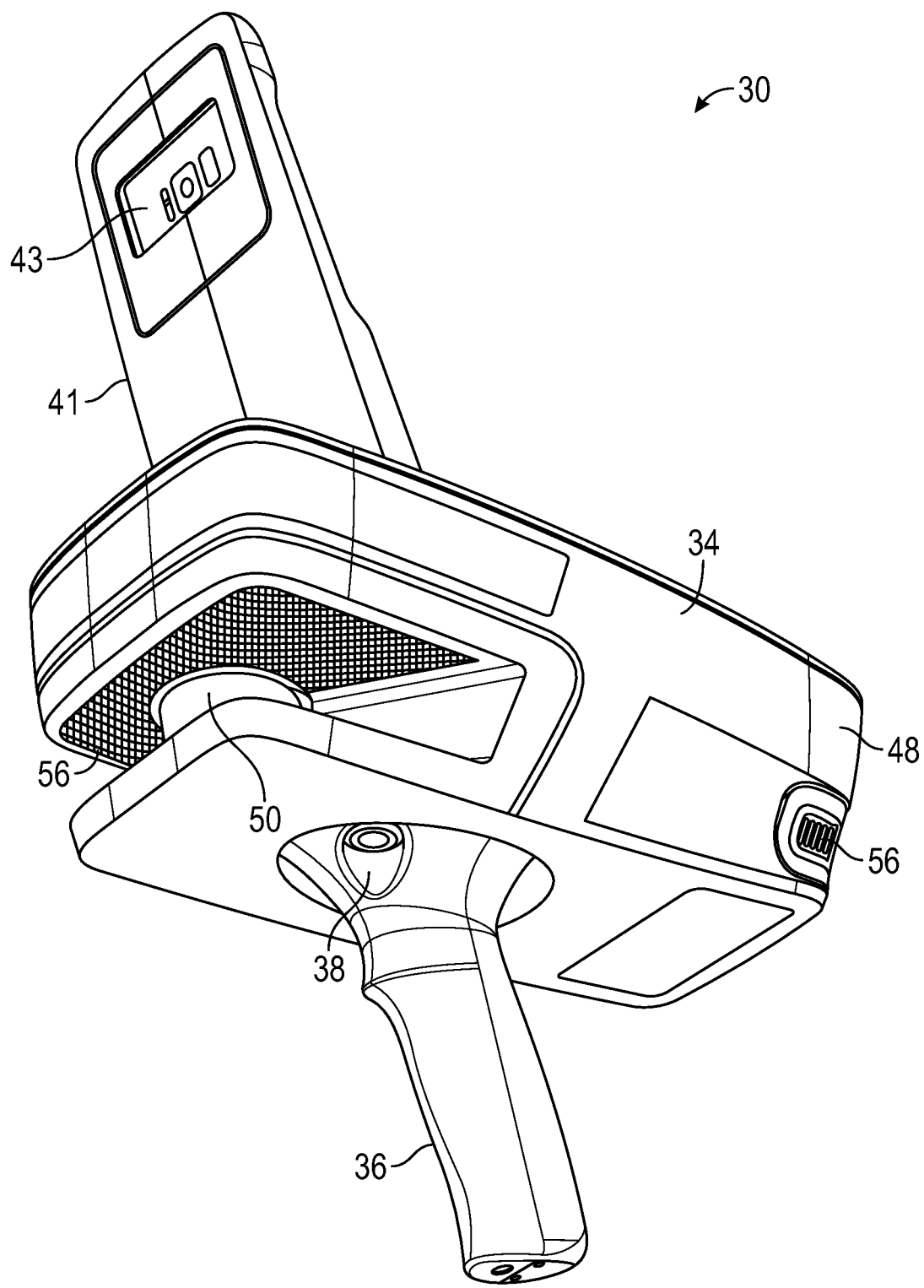
Figure 3:
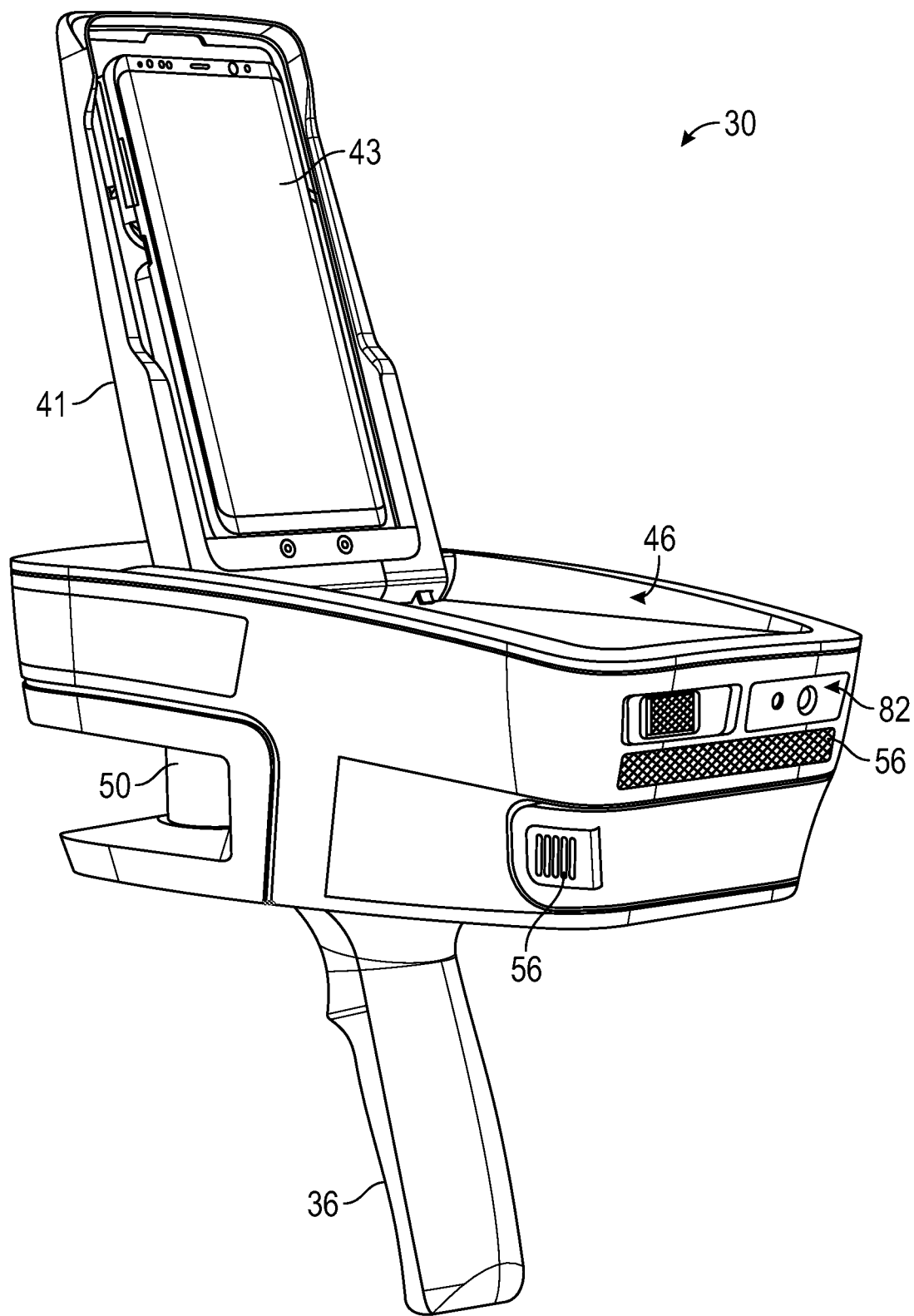

The detailed description explains embodiments of the invention, together with advantages and features, by way of example with reference to the drawings.

DETAILED DESCRIPTION

The present invention relates to a device that includes a system, such as a 2D scanner that works cooperatively with an inertial measurement unit to generate an annotated two-dimensional map of an environment for example, that is suitable for use with a plurality of interchangeable handle attachments.

Referring now to FIGS. 1-5, an example of a system 30, such as a scanner device, is illustrated according to an embodiment. As shown, the system has a housing 32 that includes a body 34 and a handle 36. In an embodiment, the handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a three-dimensional camera or RGBD camera 60.

Figure 10:
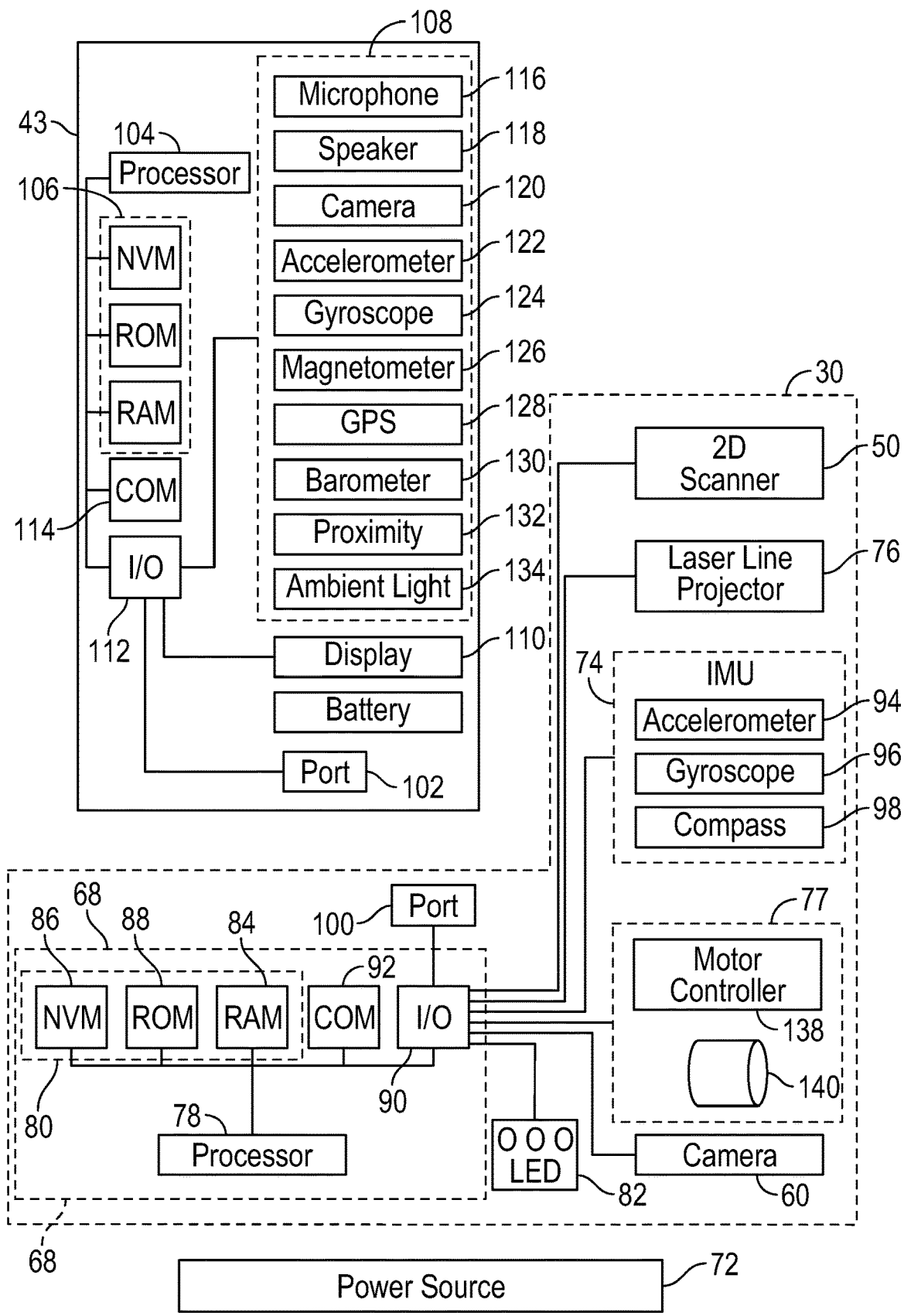
FIG. 10 is a block diagram of the system of FIG. 1 and FIG. 6.

Extending from the center portion 35 is a mobile device holder 41. The mobile device holder 41 is configured to securely couple a mobile device 43 to the housing 32. The holder 41 may include one or more fastening elements, such as a magnetic or mechanical latching element for example, that couples the mobile device 43 to the housing 32. In an embodiment, the mobile device 43 is coupled to communicate with a controller 68 (FIG. 10). The communication between the controller 68 and the mobile device 43 may be via any suitable communications medium, such as wired, wireless or optical communication mediums for example.

In the illustrated embodiment, the holder 41 is pivotally coupled to the housing 32, such that it may be selectively rotated into a closed position within a recess 46. In an embodiment, the recess 46 is sized and shaped to receive the holder 41 with the mobile device 43 disposed therein.

Figure 6:
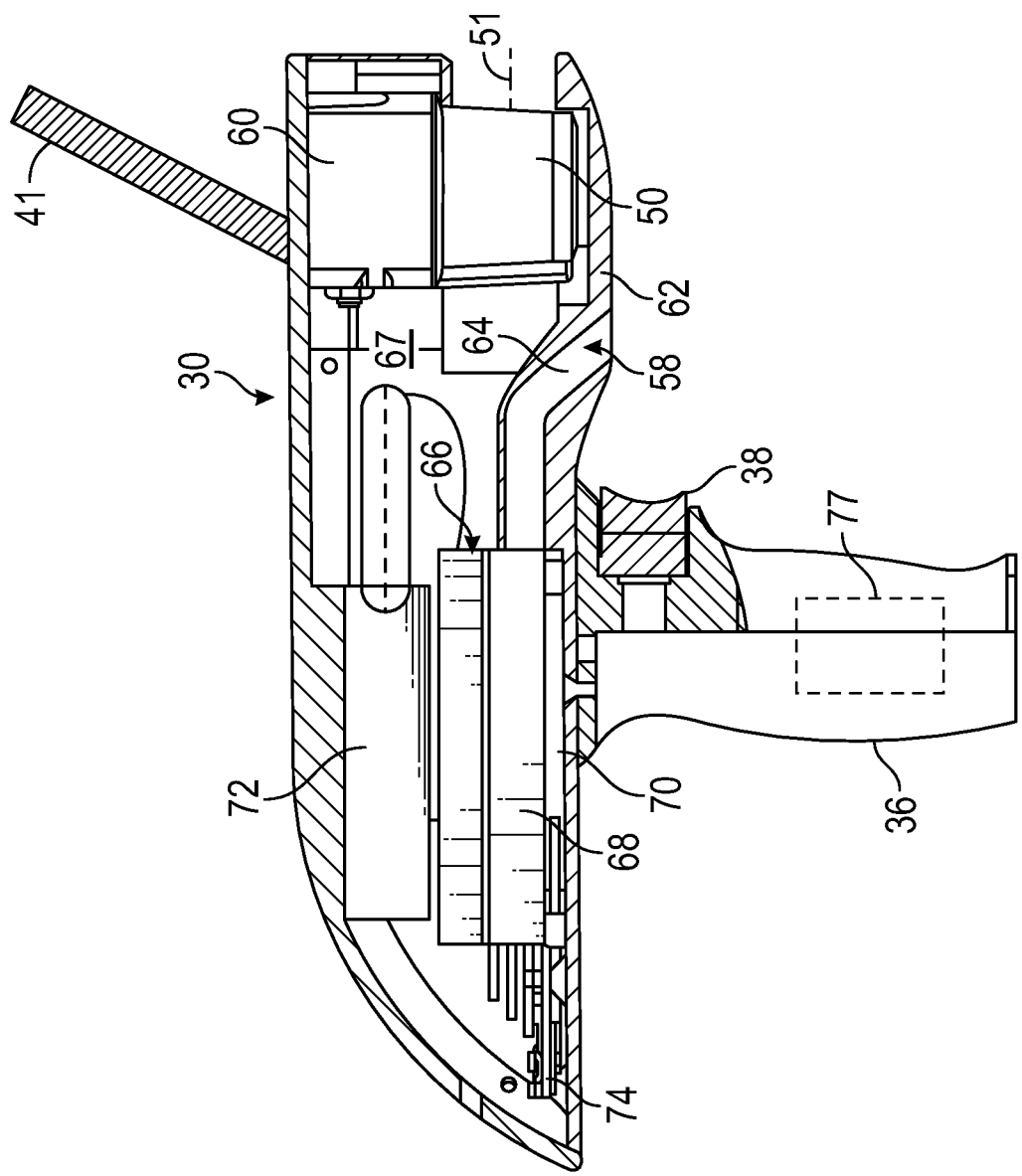
FIG. 6 is a side sectional view of the system of a scanning and mapping system in accordance with another embodiment.
Figure 7:
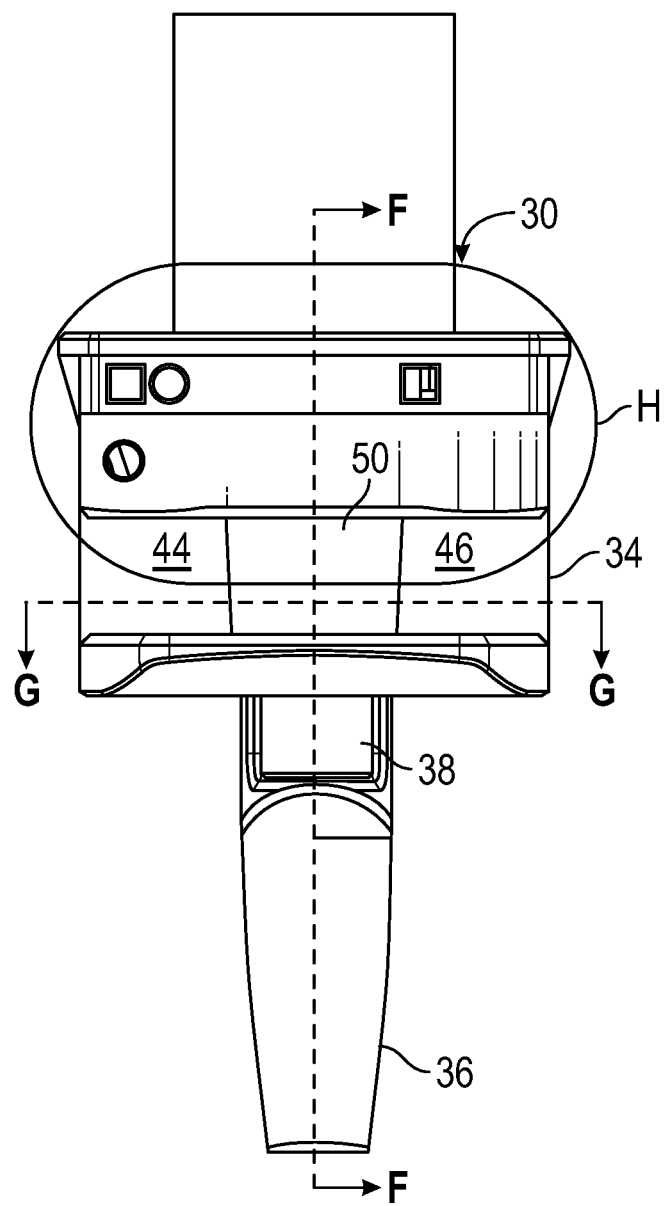
FIG. 7 is a first end view of the system of FIG. 6.
Figure 8:
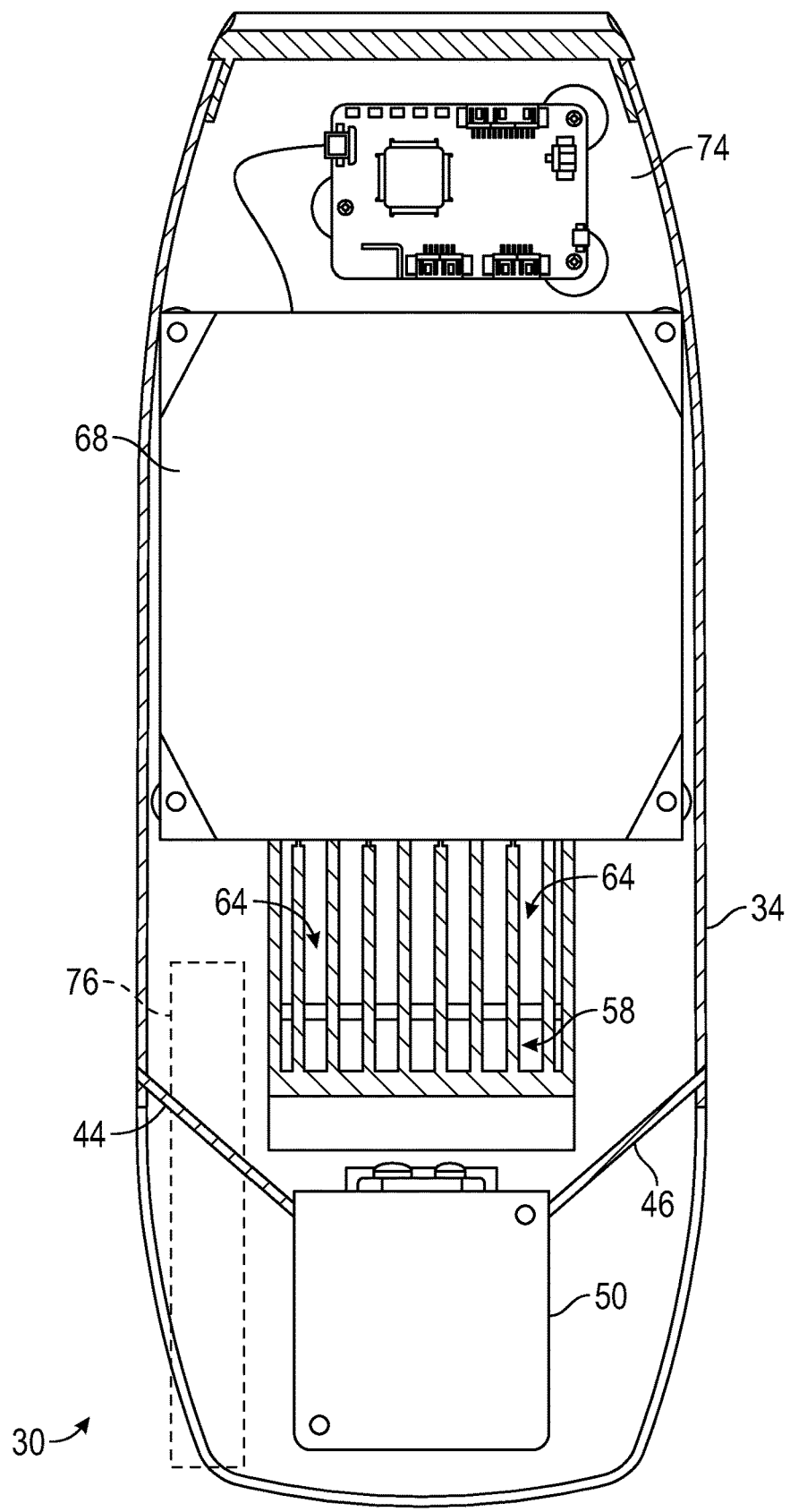
FIG. 8 is a top sectional view of the system of FIG. 6.
Figure 9:
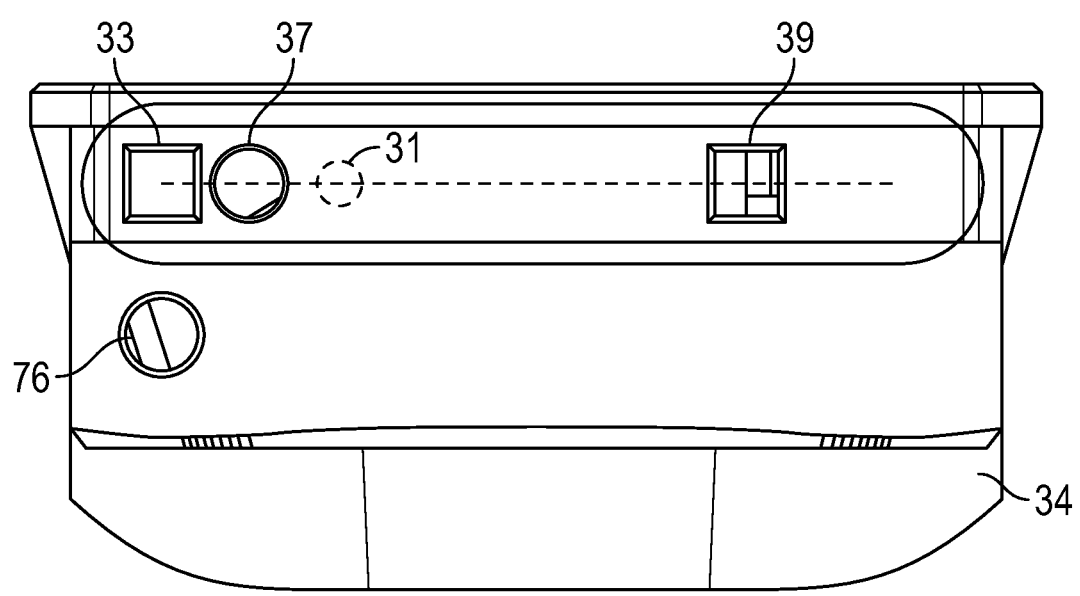
FIG. 9 is an enlarged view of a portion of the second end of FIG. 7.

In the exemplary embodiment, the second end 48 includes a plurality of exhaust vent openings 56. In an embodiment, shown in FIGS. 6-9, the exhaust vent openings 56 are fluidly coupled to intake vent openings 58 arranged on a bottom surface 62 of center portion 35. The intake vent openings 58 allow external air to enter a conduit 64 having an opposite opening 66 (FIG. 6) in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Referring now to FIG. 10 with continuing reference to FIGS. 1-9, elements are shown of the system 30 with the mobile device 43 installed or coupled to the housing 32. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 50, camera 60 and IMU 74 into a digital signal to determine a distance from the system 30 to an object in the environment. In an embodiment, the camera 60 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 32 or from sensors and devices located in the mobile device 43.

In general, when the mobile device 43 is not installed, controller 68 accepts data from 2D scanner 50 and IMU 74 and is given certain instructions for the purpose of generating a two-dimensional map of a scanned environment. Controller 68 provides operating signals to the 2D scanner 50, the camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(^) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code shown or described with reference to FIGS. 11-14 and FIG. 19. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In the embodiment shown in FIGS. 6-9, the system 30 further includes a camera 60 that is a 3D or RGB-D camera. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31 (FIG. 9), a left infrared camera 33, a right infrared camera 39, and a color camera 37. In an embodiment, the 3D camera 60 is a RealSense™ camera model R200 manufactured by Intel Corporation.

In an embodiment, when the mobile device 43 is coupled to the housing 32, the mobile device 43 becomes an integral part of the system 30. In an embodiment, the mobile device 43 is a cellular phone, a tablet computer or a personal digital assistant (PDA). The mobile device 43 may be coupled for communication via a wired connection, such as ports 100, 102. The port 100 is coupled for communication to the processor 78, such as via I/O controller 90 for example. The ports 100, 102 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 104. The processors may be microprocessors, field programmable gate arrays (FPGAs), digital signal processors (DSPs), and generally any device capable of performing computing functions. The one or more processors 104 have access to memory 106 for storing information.

The mobile device 43 is capable of converting the analog voltage or current level provided by sensors 108 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 108 and is given certain instructions for the purpose of generating or assisting the processor 78 in the generation of a two-dimensional map or three-dimensional map of a scanned environment. Mobile device 43 provides operating signals to the processor 78, the sensors 108 and a display 110. Mobile device 43 also accepts data from sensors 108, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an embodiment, the display 110 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(^) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 104 are coupled to memory 106. The memory 106 may include random access memory (RAM) device, a non-volatile memory (NVM) device, and a read-only memory (ROM) device. In addition, the processors 104 may be connected to one or more input/output (I/O) controllers 112 and a communications circuit 114. In an embodiment, the communications circuit 114 provides an interface that allows wireless or wired communication with one or more external devices or networks, such as the LAN or the cellular network discussed above.

Figure 4:
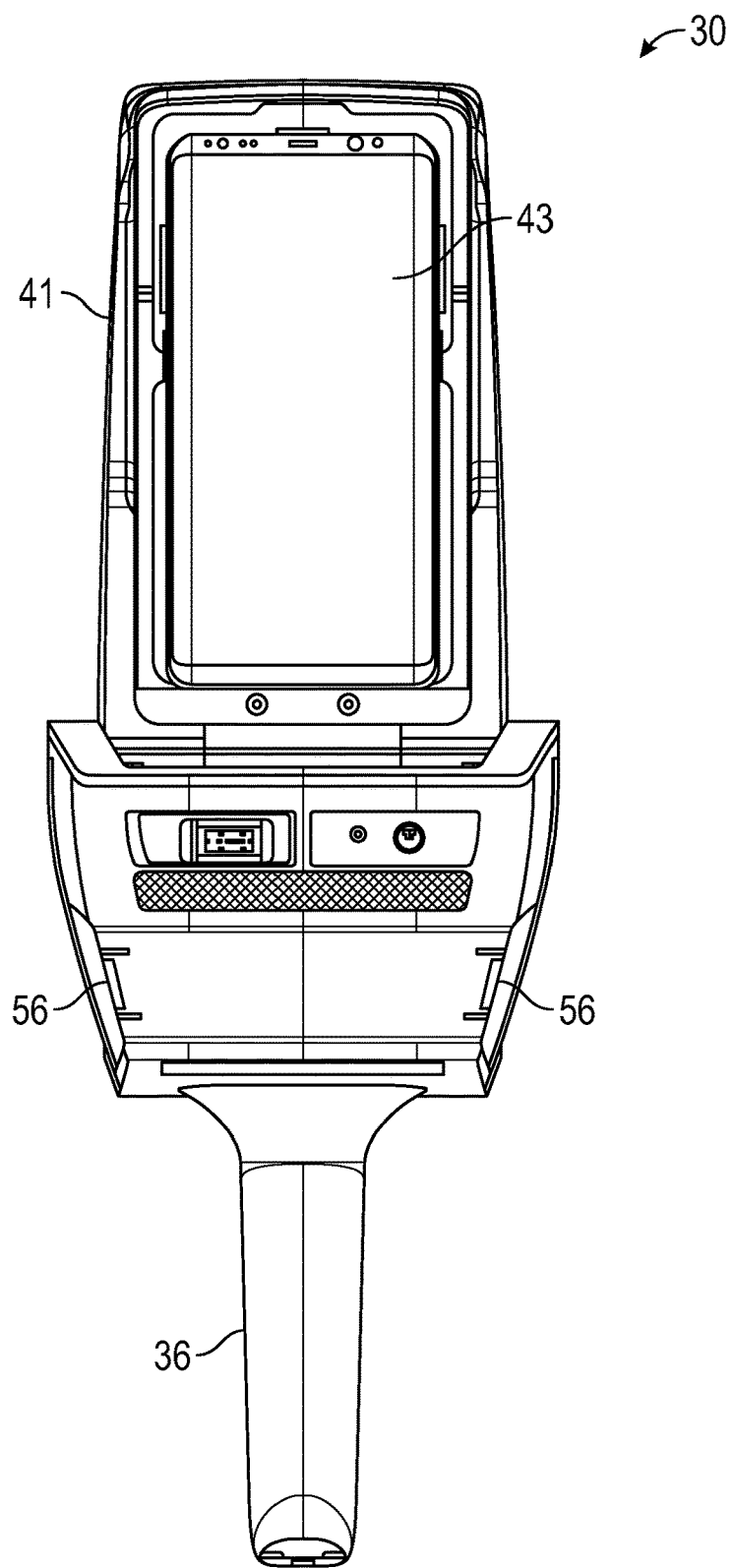
FIG. 4 is a first end view of the system of FIG. 1.
Figure 5:
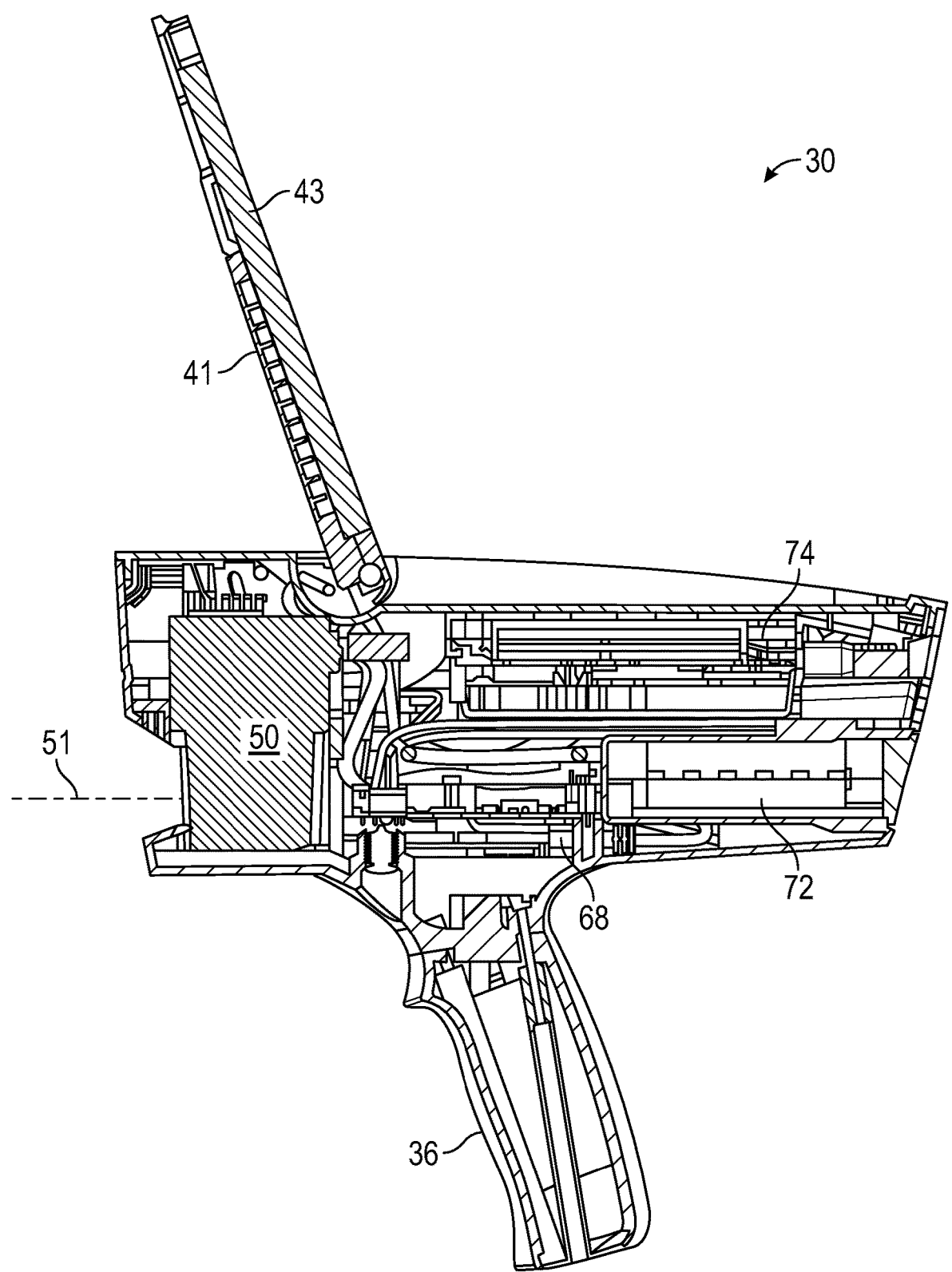
FIG. 5 is a side sectional view of the system of FIG. 1.
Figure 19:
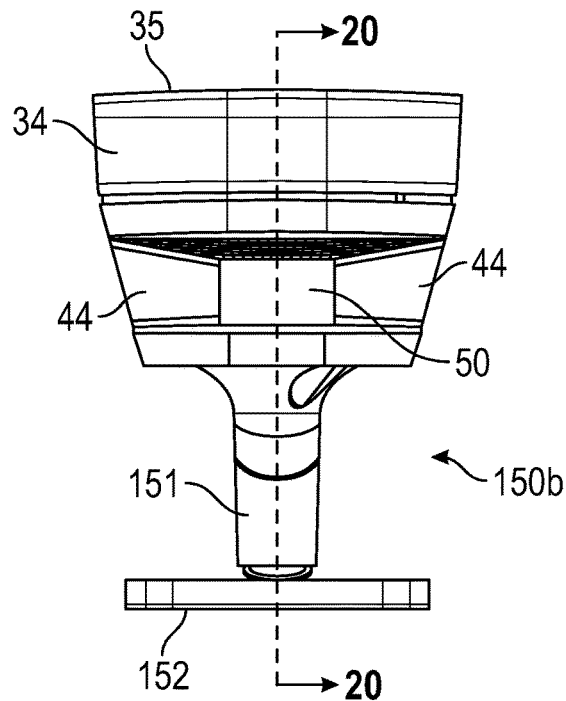
FIG. 19 is a front view of the system having a second attachment according to an embodiment.

Controller 68 includes operation control methods embodied in application code shown or described with reference to FIGS. 11-4 and FIG. 19. These methods are embodied in computer instructions written to be executed by processors 78, 104, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 104 are the sensors 108. The sensors 108 may include but are not limited to: a microphone 116; a speaker 118; a front or rear facing camera 120; accelerometers 122 (inclinometers), gyroscopes 124, a magnetometers or compass 126; a global positioning satellite (GPS) module 128; a barometer 130; a proximity sensor 132; and an ambient light sensor 134. By combining readings from a combination of sensors 108 with a fusion algorithm that may include a Kalman filter, relatively accurate position and orientation measurements can be obtained.

It should be appreciated that the sensors 60, 74 integrated into the scanner 30 may have different characteristics than the sensors 108 of mobile device 43. For example, the resolution of the cameras 60, 120 may be different, or the accelerometers 94, 122 may have different dynamic ranges, frequency response, sensitivity (mV/g) or temperature parameters (sensitivity or range). Similarly, the gyroscopes 96, 124 or compass/magnetometer may have different characteristics. It is anticipated that in some embodiments, one or more sensors 108 in the mobile device 43 may be of higher accuracy than the corresponding sensors 74 in the system 30. As described in more detail herein, in some embodiments the processor 78 determines the characteristics of each of the sensors 108 and compares them with the corresponding sensors in the system 30 when the mobile device. The processor 78 then selects which sensors 74, 108 are used during operation. In some embodiments, the mobile device 43 may have additional sensors (e.g. microphone 116, camera 120) that may be used to enhance operation compared to operation of the system 30 without the mobile device 43. In still further embodiments, the system 30 does not include the IMU 74 and the processor 78 uses the sensors 108 for tracking the position and orientation/pose of the system 30. In still further embodiments, the addition of the mobile device 43 allows the system 30 to utilize the camera 120 to perform three-dimensional (3D) measurements either directly (using an RGB-D camera) or using photogrammetry techniques to generate 3D maps. In an embodiment, the processor 78 uses the communications circuit (e.g. a cellular 4G internet connection) to transmit and receive data from remote computers or devices.

The plane 136 (FIG. 12) in which the 2D scanner 50 projects a light beam may not be horizontal relative to the floor or may continuously change as the computer moves during the scanning process. Thus, the signals generated by the accelerometers 94, gyroscopes 96 and compass 98 (or the corresponding sensors 108) may be used to determine the pose (yaw, roll, tilt) of the system 30 and determine the orientation of the plane 51.

In an embodiment, it may be desired to maintain the pose of the system 30 (and thus the plane 136) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 138 that activates a vibration motor 140. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 136 to be within 10-15 degrees of horizontal (relative to the ground) about the yaw, roll and pitch axes.

In an embodiment, the 2D scanner 50 makes measurements as the system 30 is moved about an environment. In an embodiment, 2D scan data is collected and processed as the system 30 passes through a plurality of 2D measuring positions. At each measuring position, the 2D scanner 50 collects 2D coordinate data over an effective field of view. The controller 68 uses 2D scan data from the plurality of 2D scans at the plurality of measuring positions to determine a position and orientation of the system 30 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D scanner 50.

Figure 11:
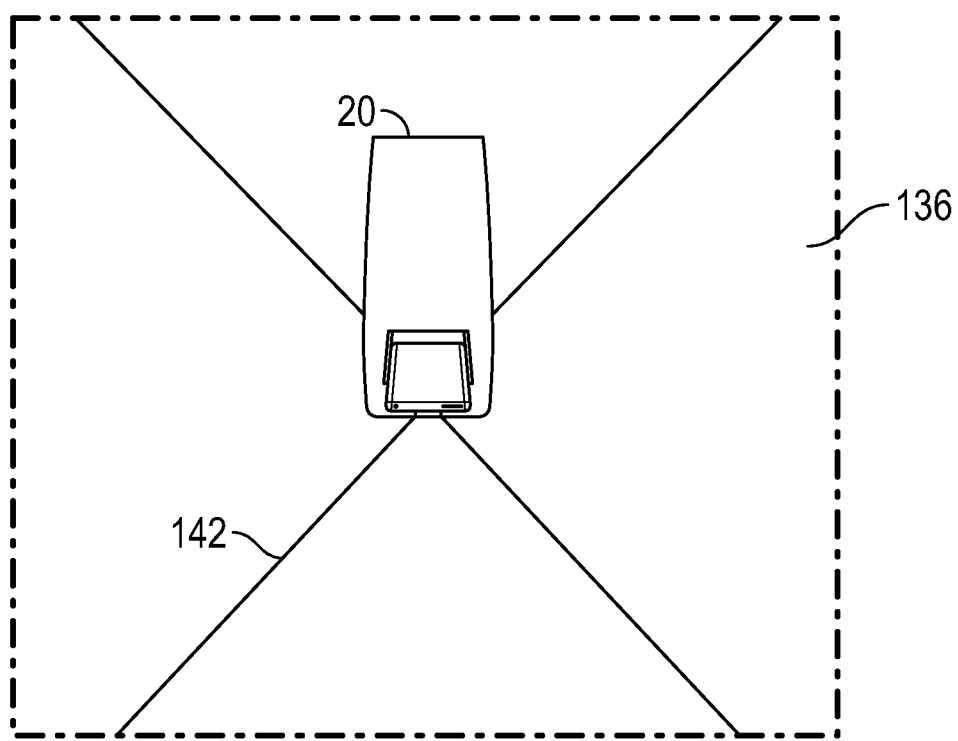
FIG. 11-12 are schematic views of the operation of the system of FIG. 9 in accordance with an embodiment.
Figure 12:
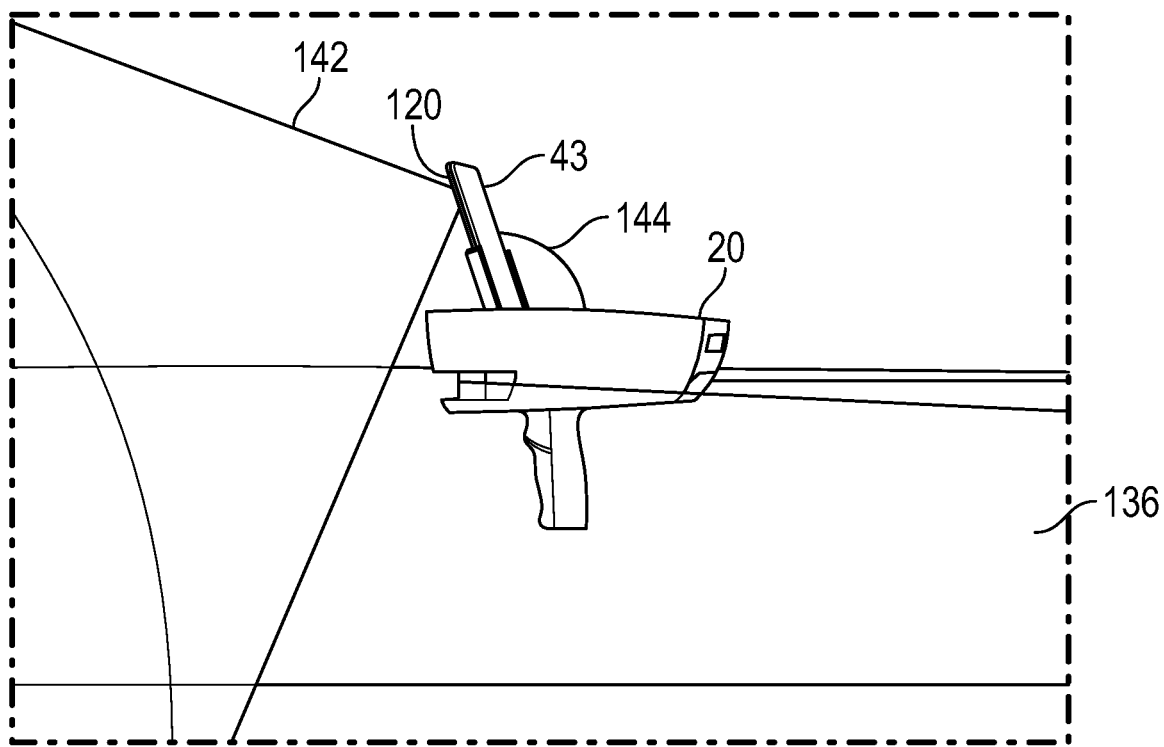
Figure 13:
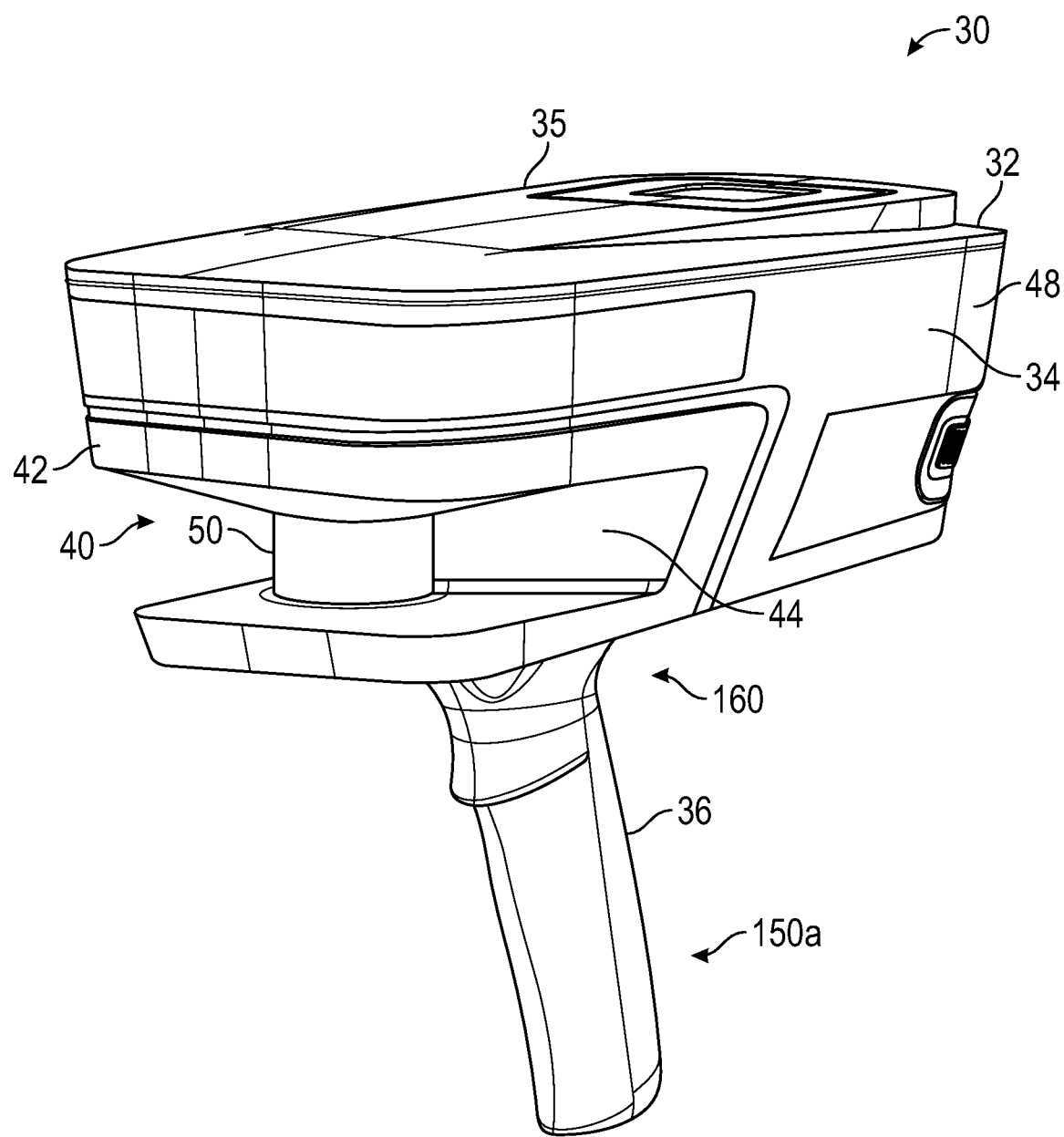
FIG. 13 is a perspective view of the system having a first attachment according to an embodiment.

Referring now to FIG. 11 and FIG. 12, an embodiment is illustrated with a mobile device 43 coupled to the system 30. As described herein, the 2D scanner 50 emits a beam of light in the plane 136. The 2D scanner 50 has a field of view (FOV) that extends over an angle that is less than 360 degrees. In the exemplary embodiment, the FOV of the 2D scanner is about 270 degrees. In this embodiment, the mobile device 43 is coupled to the housing 32 adjacent the end where the 2D scanner 50 is arranged. The mobile device 43 includes a forward facing camera 120. The camera 120 is positioned adjacent a top side of the mobile device and has a predetermined field of view 142. In the illustrated embodiment, the holder 41 couples the mobile device 43 on an obtuse angle 144. This arrangement allows the mobile device 43 to acquire images of the floor and the area directly in front of the system 30 (e.g. the direction the operator is moving the system 30).

In embodiments where the camera 120 is a RGB-D type camera, three-dimensional coordinates of surfaces in the environment may be directly determined in a mobile device coordinate frame of reference. In an embodiment, the holder 41 allows for the mounting of the mobile device 43 in a stable position (e.g. no relative movement) relative to the 2D scanner 50. When the mobile device 43 is coupled to the housing 32, the processor 78 performs a calibration of the mobile device 43 allowing for a fusion of the data from sensors 108 with the sensors of system 30. As a result, the coordinates of the 2D scanner may be transformed into the mobile device coordinate frame of reference or the 3D coordinates acquired by camera 120 may be transformed into the 2D scanner coordinate frame of reference.

In an embodiment, the mobile device 43 is calibrated to the 2D scanner 50 by assuming the position of the mobile device 43 based on the geometry and position of the holder 41 relative to 2D scanner 50. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 43 in the holder 41. In another embodiment, a calibration is performed each time a different mobile device 43 is used. In this embodiment, the user is guided (such as via the user interface 110) to direct the system 30 to scan a specific object, such as a door, that can be readily identified in the laser readings of the system 30 and in the camera-sensor 120 using an object recognition method.

With reference now to FIGS. 13-20, in an embodiment, the system 30 may be adapted to receive a plurality of interchangeable supports or attachments. Each of the plurality of attachments may be associated with a type of operation of the system 30. For example, the handle 36 previously described herein, may be considered a first attachment 150*a* suitable for use during a first type of operation which includes applications where the system 30 is to be hand-held and/or manipulated by hand. A second attachment 150*b*, such as a mounting stand 151 having a support base 152 defining a planar mounting surface shown in FIGS. 17-20, may be suitable for used during a second type of operation, including applications where the system 30 is to be positioned on a planar surface. Yet another attachment (not shown) may include a connector suitable for mounting the system 30 to a support structure, such as a tripod for example.

The body 34 of the system 30 includes a connector assembly 160 configured to selectively couple each of the plurality of attachments 150 to the body 34. An example of a connector assembly 160 is illustrated in the FIGS. In an embodiment, as best shown in FIGS. 13, 15, 18, and 20, a structural chassis 162 protrudes from a bottom surface 164 of body 34. The connector assembly 160 includes a chassis adapter 166 configured to abut at least a portion of the chassis 162, such as an end 168 thereof. A surface or portion 170 of the chassis adapter 166 configured to contact the chassis 162 may have a contour complementary to the adjacent end 168 of the chassis 162. In the illustrated, non-limiting embodiment, the chassis adapter 166 includes a protrusion 172 that extends beyond the plane of the surface 170, such as at a non-perpendicular angle for example. This protrusion 172 may be positionable within a corresponding groove or seat 174 formed in the chassis 162 to facilitate proper positioning of the chassis adapter 166 relative to the chassis 162.

As shown, an inwardly extending opening 176 is formed at the end 168 of the chassis 162. The chassis adapter 166 similarly includes a bore 178, such as a countersunk bore for example, and when the chassis adapter 166 is mounted to the chassis 162, the bore 178 is axially aligned with the opening 176 in the chassis 162. In an embodiment, as shown in the FIGS., a nut 180, such as formed by a thread adapter for example, is positioned within the opening 176 of the chassis 162. As shown, the thread adapter 180 includes a plurality of external threads 182 configured to couple with a plurality of threads 184 formed at the inner surface of the opening 176. In the illustrated, non-limiting embodiment, the axial length of the thread adapter 180 is less than the axial length of the opening 176; however, embodiments where the axial length of the thread adapter 180 is equal to, or even greater than the axial length of the opening 176 are also contemplated herein.

Similarly, a fastener 185 arranged within the bore 178 of the chassis adapter 166 is receivable within a hollow interior 186 of the thread adapter 180. The fastener 185 and the thread adapter 180 may cooperate to form a set screw. In an embodiment, the fastener 185 is configured to threadably couple to a plurality of threads 188 formed at an interior surface of the thread adapter 180. In an embodiment, the axial length of the plurality of threads 188 formed at the inner surface is less than the axial length of the plurality of external threads 182. However, embodiments where the axial length of the threaded portion of the fastener 185 and the thread adapter 180 are equal are also within the scope of the disclosure.

Figure 16:
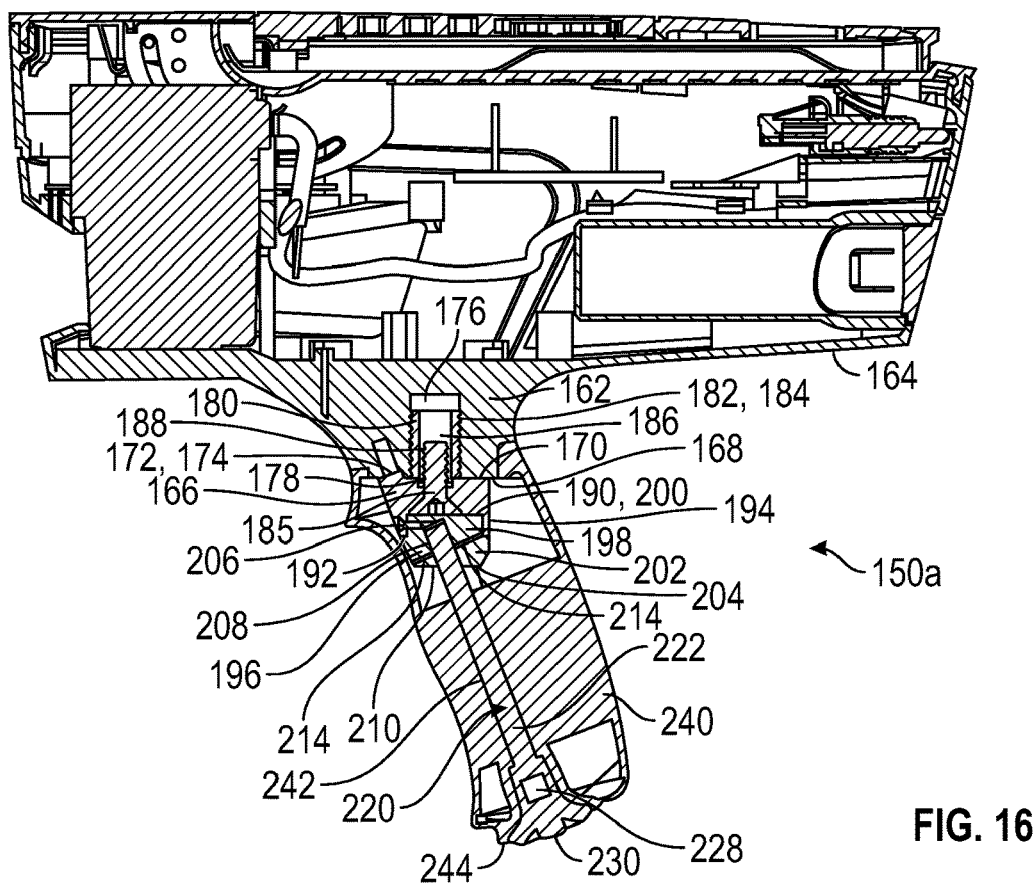
FIG. 16 is a cross-sectional view of the system having a first attachment taken along line A-A of FIG. 15 according to an embodiment.
Figure 17:
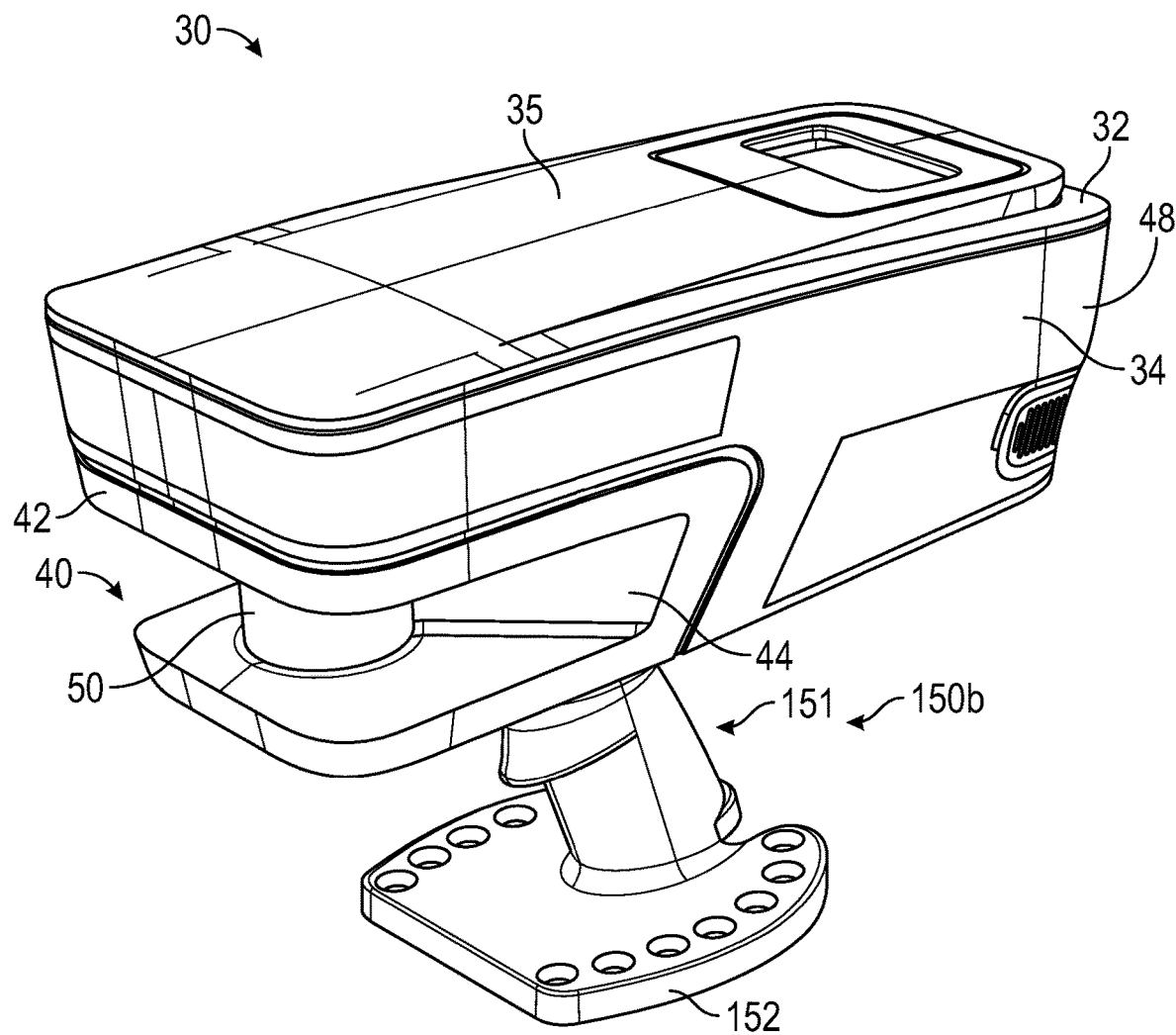
FIG. 17 is a perspective view of the system having a second attachment according to an embodiment.
Figure 20:
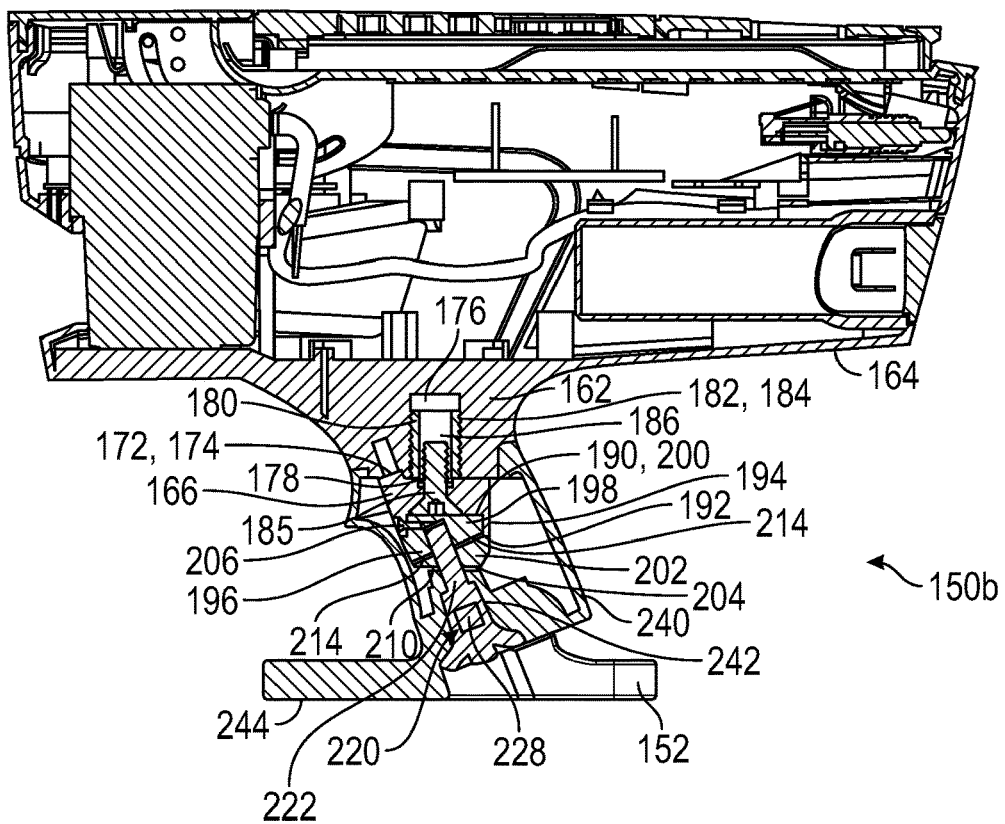
FIG. 20 is a cross-sectional view of the system having a second attachment taken along line B-B of FIG. 19 according to an embodiment.

As best shown in FIGS. 16 and 20, a shallow groove 190 may be formed generally centrally at a second, opposite end 192 of the chassis adapter 166. As a result, the sidewalls of the chassis adapter 166 adjacent the groove 190 define a collar 194 extending about the periphery of the chassis adapter 166.

The connector assembly 160 additionally includes a lock pin adapter 196 configured to couple to the second end 192 of the chassis adapter 166. In the illustrated, non-limiting embodiment, the lock pin adapter 196 includes a first section 198 arranged adjacent a first end 200, and a second section 202 arranged at the second end 204 thereof. In the illustrated, non-limiting embodiment, the first section 198 has a first diameter, and the second section 202 has a second diameter, larger than the first diameter. Accordingly, when the lock pin adapter 196 is coupled to the chassis adapter 166, the first section 198 is received within the shallow groove 190. Further, the second diameter of the second section 202 may be generally equal to the diameter of the second end 192 of the chassis adapter 166 such that the exterior surface of the chassis adapter 166 is flush with the exterior surface of the second section 202 of the lock pin adapter 196.

One or more fasteners 206, such as screws for example, may be used to attach the lock pin adapter 196 to the chassis adapter 166. For example, the one or more screws 206 may extend through openings (not shown) formed in the collar 194 of the chassis adapter 166 and into the first section 198 of the lock pin adapter 196.

An opening or bore 208 is formed at the second end 204 of the lock pin adapter 196 and extends over a portion of the length thereof. In addition, one or more channels 214 are arranged at the interior of the lock pin adapter 196. In the illustrated, non-limiting embodiment, the at least one channel 214 includes two channels arranged on opposite sides of the central bore 208. Although the two channels are shown as being coaxial, embodiments where the channels 214 are offset from one another are also contemplated herein. Further, embodiments including a single channel 214, or alternatively, more than two channels 214, and/or where the channels 214 are arranged at the same side, or opposite sides of the bore 208, are also contemplated herein. It should be understood that the connector assembly 160 illustrated and described herein is intended as an example only, and that any connector assembly 160 for mounting a lock pin adapter 196, including a bore 208 and one or more channels 214, to the body 34 of the system 30 is within the scope of the disclosure.

Figure 14:
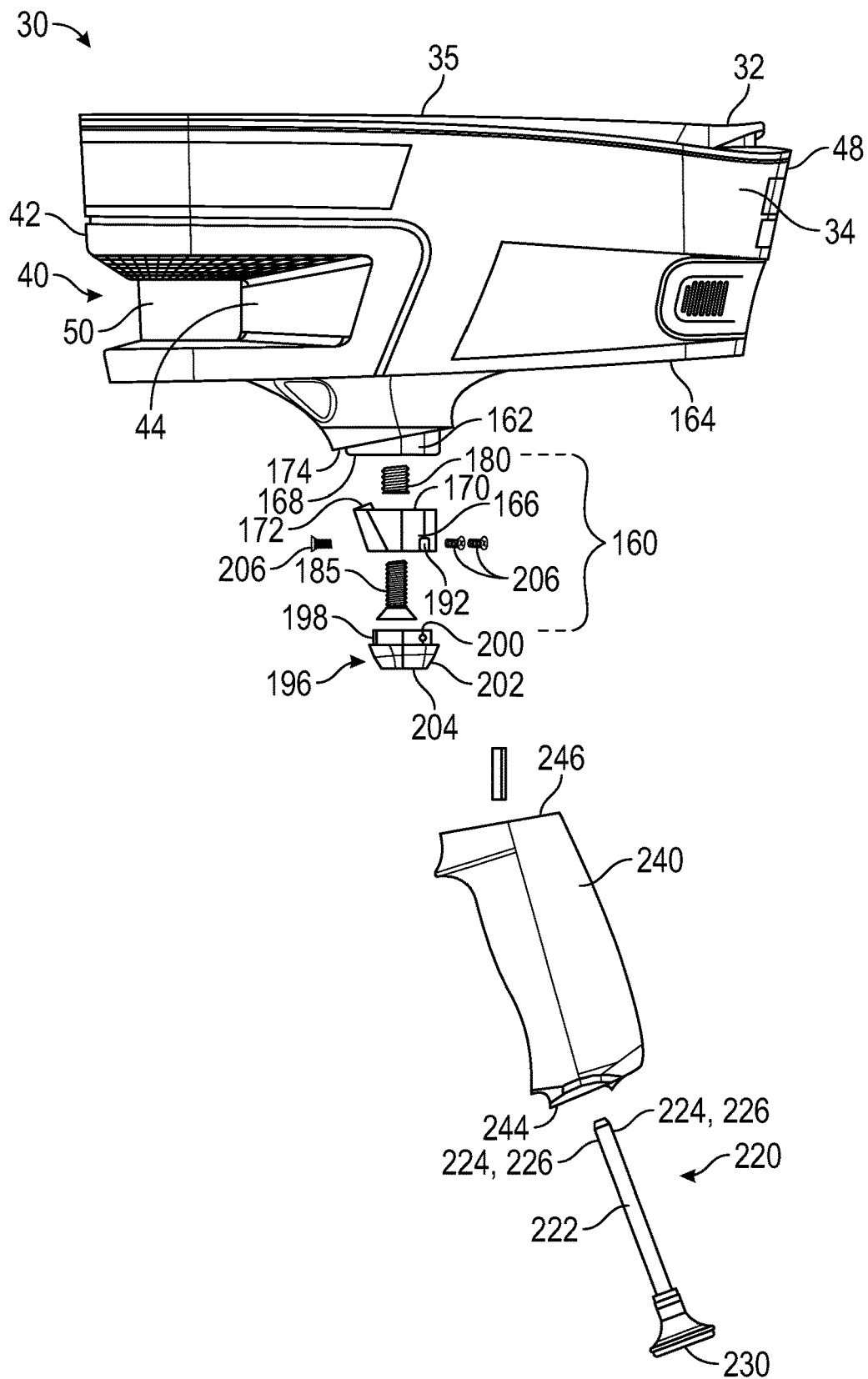
FIG. 14 is a partially exploded side view of a connector assembly and the first attachment of the system of FIG. 13 according to an embodiment.
Figure 15:
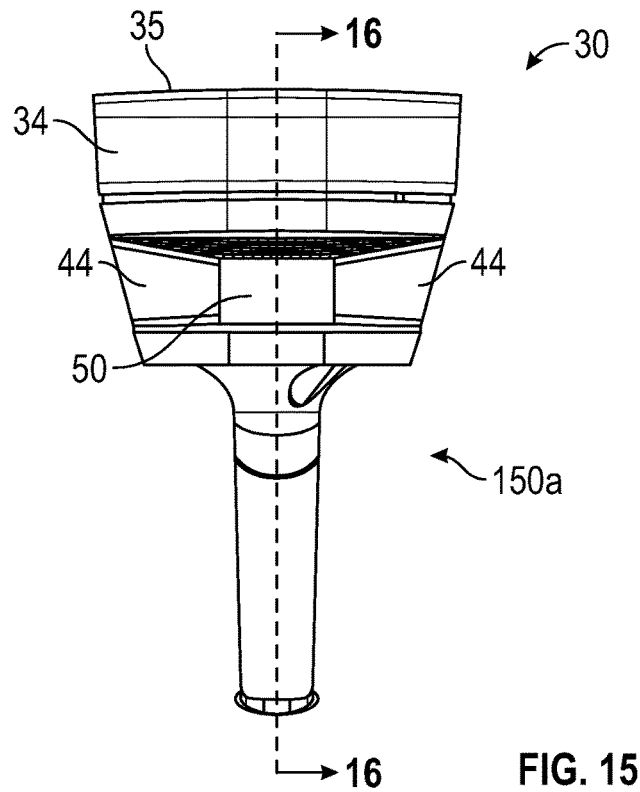
FIG. 15 is a front view of the system having a first attachment according to an embodiment.
Figure 18:
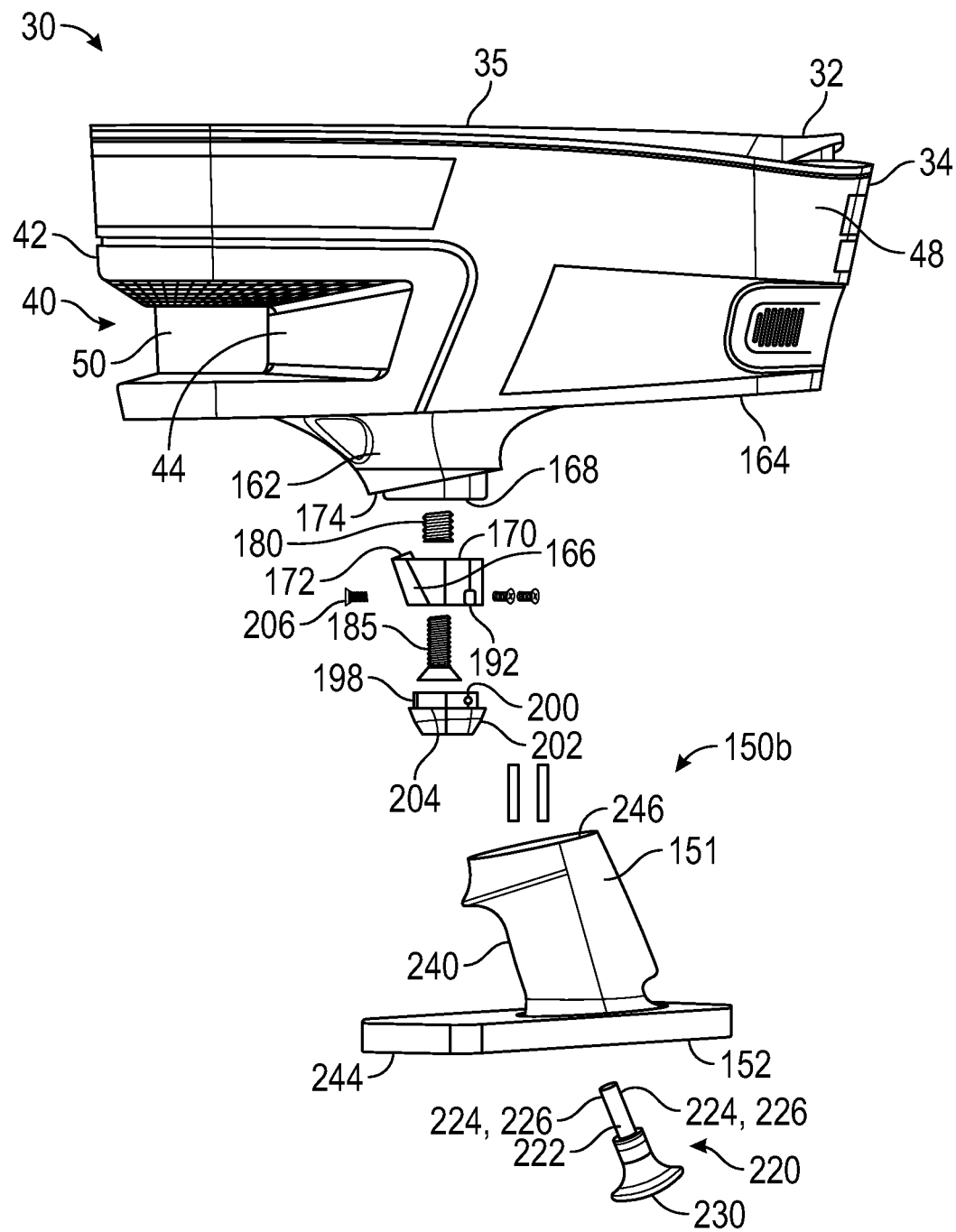
FIG. 18 is a partially exploded side view of a connector assembly and the second attachment of the system of FIG. 17 according to an embodiment.

At least a portion of a lock pin 220 is receivable within the bore 208 formed in the lock pin adapter 196. An example of a lock pin 220 is illustrated in the FIGS. As best shown in FIGS. 14 and 18, the lock pin 220 generally includes an elongated shaft 222 having one or more openings 224 formed therein. One or more detents 226, such as balls for example, are arranged within the shaft 222 such that each of the detents 226 protrudes outwardly through one of the openings 224 in the shaft 222. In an embodiment, the total number of detents 226 and the positioning of the detents 226 corresponds to the channels 214 formed in the lock pin adapter 196. Further, the diameter of each of the detents 226 is generally equal to or slightly smaller than a corresponding channel 214 so that the detent 226 is receivable therein.

An actuator, illustrated schematically at 228, is arranged within the shaft 222 or head 230 of the lock pin 220 and is operably coupled to each of the detents 226 such that the detents 226 are movable simultaneously from a first, extended position to a second, retracted position. When the actuator 228 is operated, such as by applying a force to an end or head 230 of the lock pin 220 for example, the detents 226 are retracted into the interior of the shaft 222. Upon release of the force from the head 230, a biasing mechanism (not shown) associated with the actuator 228 applies a biasing force to the detents 226, causing the detents 226 to translate back to a position protruding through the openings 224 in the shaft 222.

Each of the plurality of attachments 150 includes a housing 240 having an opening 242 within which the lock pin 220 is received. Although a single lock pin 220 may be used to couple each of the attachments 150 to the chassis 162 of the system 30, in an embodiment, each of the attachments 150 includes a distinct lock pin 220 associated therewith. Further, in an embodiment, the lock pin 220 may be coupled to the housing 240 of the attachment 150, such as via a lock washer or snap ring for example, to restrict movement of the lock pin relative to the housing 240, and therefore loss of the lock pin 220. The opening 242 formed in the housing 240 of the attachment may, but need not be, countersunk such that actuatable head 230 of the lock pin 220 is arranged within the housing 240 of the attachment 150. By embedding the lock pin 220 in this manner, the lock pin 220 does not interfere with the configuration of the distal end 244 of the attachment.

To couple one of the plurality of attachments to the body 34 of the system 30, the housing 240 of the attachment 150 is positioned adjacent the connector assembly 160, such as in overlapping arrangement with the lock pin adapter 196. In an embodiment, the contour of the housing 240 of the attachment 150 adjacent a first end 246 is configured to mate with the chassis 162 such that the connector assembly 160 is arranged within an interior of the housing 240. Once the housing 240 of the attachment is positioned relative to the body 34, the lock pin 220 is inserted through the opening 242 formed in the housing 240, and into the bore 208 formed in the lock pin adapter 196. Alternatively, the lock pin 220 may be affixed to the housing 240 such that the housing 240 and the lock pin 220 are installed to the connector assembly 160 simultaneously. To install the lock pin 220 into the bore 208 of the lock pin adapter 196, a force is applied to the actuatable end 230 of the lock pin 220 such that the detents 226 are retracted into the interior of the shaft 222 of the lock pin 220. Once fully inserted, the force may be removed from the head 230 of the lock pin 220, causing the detents 226 to bias into the extended position protruding through the openings 224 formed in the shaft 222. When the lock pin 220 is properly positioned, each of these detents 226 is received within a corresponding channel 214 formed in the lock pin adapter 196. Once engagement between the detents 226 and the channels 214 occurs, movement of the lock pin 220, and therefore the attachment 150, relative to the body 34 of the system 30 is prevented.

Similarly, to disconnect the attachment 150 from the body 34 of the system 30, a user applies a force to the actuatable end 230 of the lock pin 220. With this force, the actuator 228 of the lock pin 220 is transformed to the actuated position, causing the detents 226 to retract into the interior of the shaft 222. With the detents retracted 226, the shaft 222 of the lock pin 220 can be moved, for example translated, relative to the lock pin adapter 196 and/or to the housing 240, without interference between the detents 226 and the adjacent surface of each component 196, 240. Accordingly, the attachments of a system 30 including a multi-dimensional scanner, as illustrated and described herein, can be easily connected and separated from the body 34 of the scanner 30 in response to application of a single force to an actuator of the lock pin 220.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system including a multi-dimensional scanner comprising:
    a body including a chassis extending from the body;
    a connector assembly coupled to the chassis; and
    a plurality of interchangeable attachments, each of the plurality of interchangeable attachments being securable to the body via the connector assembly, wherein each of the plurality of interchangeable attachments is associated with a type of operation of the system;
    wherein each of the plurality of interchangeable attachments is securable to the connector assembly via a lock pin having at least one detent movable between an extended position and a retracted position.

2. The system of claim 1, wherein the connector assembly is receivable within an interior of at least one of the plurality of interchangeable attachments.

3. The system of claim 1, wherein at least one of the plurality of interchangeable attachments includes a handle.

4. The system of claim 1, wherein at least one of the plurality of interchangeable attachments includes a mounting stand having a planar mounting surface.

5. The system of claim 1, wherein the connector assembly further comprises a bore and at least one channel extending from the bore, and the lock pin further comprises a shaft including the at least one detent movable between an extended position and a retracted position, wherein when one of the plurality of interchangeable attachments is secured to the connector assembly, the shaft is arranged within the bore and the at least one detent is arranged within the at least one channel.

6. The system of claim 5, wherein the lock pin further comprises:
    a biasing mechanism for biasing the at least one detent into the extended position; and
    an actuator operably coupled to the at least one detent, the actuator being operable to oppose a biasing force of the biasing mechanism and transform the at least one detent into the retracted position arranged within the shaft.

7. The system of claim 5, wherein the connector assembly further comprises:
    a chassis adapter; and
    a lock pin adapter affixed to the chassis adapter, wherein the lock pin adapter includes the bore and the at least one channel.

8. The system of claim 7, wherein the chassis adapter is connectable to the chassis via a set screw.

9. The system of claim 7, wherein the lock pin adapter further comprises a first section and a second section, and the chassis adapter further comprises a shallow groove, the first section of the lock pin adapter being positioned within the shallow groove.

10. The system of claim 9, wherein an exterior surface of the chassis adapter is flush with an exterior of the second section of the lock pin adapter.

11. The system of claim 1, wherein the plurality of interchangeable attachments includes a first attachment and a second attachment, the first attachment including a first lock pin, and the second attachment including a second lock pin.

12. The system of claim 11, wherein the first lock pin is affixed to the first attachment.

13. A method of connecting a plurality of interchangeable attachments to a body of a system including a multi-dimensional scanner, the method comprising:
    connecting a first attachment of the plurality of interchangeable attachments to the body of the system for a first type of operation of the system, wherein connecting the first attachment to the body further comprises installing a locking pin extending from the first attachment into the body, the portion of the locking pin receivable within the body including at least one detent movable between an extended position and a retracted position;
    disconnecting the first attachment from the body;
    connecting a second attachment of the plurality of interchangeable attachments to the body for a second type of operation of the system, wherein during the first type of operation, the system is hand-held, and during the second type of operation, the system is positioned on a mounting surface.

14. The method of claim 13, wherein connecting at least one of the first attachment and the second attachment to the body of the system further comprises:
- operating an actuator of the lock pin to retract the at least one detent of the lock pin; and
- releasing the actuator when the at least one detent of the lock pin is aligned with one or more channels formed in the connector assembly; and
- biasing the at least one detent of the lock pin outwardly and into engagement with the one or more channels of the connector assembly to couple the first attachment to the connector assembly.

15. The method of claim 14, wherein a single lock pin is used for connecting the first attachment to the body and for connecting the second attachment to the body.

16. The method of claim 14, wherein a first lock pin is used for connecting the first attachment to the body and a second lock pin is used for connecting the second attachment to the body.

17. The method of claim 14, wherein disconnecting the first attachment from the body further comprises:
- operating the actuator of the lock pin associated to retract the at least one detente of the lock pin;
- removing the lock pin from the connector assembly; and
- releasing the actuator when the first attachment is separated from the connector assembly.

* * * * *